United States Patent
Rho et al.

(10) Patent No.: US 9,988,576 B2
(45) Date of Patent: Jun. 5, 2018

(54) LIQUID CRYSTAL COMPOSITION AND LIQUID CRYSTAL DISPLAY DEVICE

(71) Applicant: Samsung Display Co. Ltd., Yongin-si, Gyeonggi-do (KR)

(72) Inventors: Soon Joon Rho, Hwaseong-si (KR); Joon Hyung Park, Seoul (KR); Jong Ho Son, Seoul (KR); Beom Soo Shin, Hwaseong-si (KR); Kang Seob Jeong, Seongnam-si (KR); Si Heun Kim, Hwaseong-si (KR); Kyung Hae Park, Seongnam-si (KR); Keun Chan Oh, Hwaseong-si (KR); Hye Lim Jang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days. days.

(21) Appl. No.: 15/186,983

(22) Filed: Jun. 20, 2016

(65) Prior Publication Data

US 2017/0174990 A1  Jun. 22, 2017

(30) Foreign Application Priority Data

Dec. 21, 2015  (KR) ........................ 10-2015-0182894

(51) Int. Cl.
| | |
|---|---|
| *G02F 1/1333* | (2006.01) |
| *C09K 19/30* | (2006.01) |
| *G02F 1/1337* | (2006.01) |
| *G02F 1/1339* | (2006.01) |
| *G02F 1/1368* | (2006.01) |
| *C09K 19/12* | (2006.01) |

(52) U.S. Cl.
CPC ........ *C09K 19/3003* (2013.01); *G02F 1/1368* (2013.01); *G02F 1/13394* (2013.01); *G02F 1/133711* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3027* (2013.01); *G02F 2001/13398* (2013.01)

(58) Field of Classification Search
CPC .......... C09K 19/3003; C09K 2019/122; C09K 2019/123; C09K 2019/301; C09K 2019/3027; C09K 2019/3004; C09K 2019/3016; G02F 1/1333; G02F 1/13368; G02F 1/13394; G02F 1/133711; G02F 2001/13398
USPC .............. 252/299.01, 299.6, 299.63; 428/1.1
See application file for complete search history.

(56) References Cited

U.S. PATENT DOCUMENTS

| | | | |
|---|---|---|---|
| 9,284,488 B2 * | 3/2016 | Rho .................... | C09K 19/2014 |
| 2017/0031213 A1 * | 2/2017 | Kwon ............... | G02F 1/133711 |

FOREIGN PATENT DOCUMENTS

| | | |
|---|---|---|
| KR | 101431935 B1 | 8/2014 |
| KR | 1020140135261 | 11/2014 |
| KR | 1020150028405 | 3/2015 |

* cited by examiner

*Primary Examiner* — Geraldina Visconti
(74) *Attorney, Agent, or Firm* — Cantor Colburn LLP

(57) ABSTRACT

A liquid crystal display device comprises a display panel including a first base substrate, a switching element disposed on the first base substrate, a color filter layer disposed on the switching element, and a pixel electrode disposed on the color filter layer; a counter display panel including a second base substrate and a common electrode disposed on the second base substrate and facing the display panel; a liquid crystal layer disposed between the display panel and the counter display panel and having negative dielectric anisotropy, wherein the liquid crystal layer includes at least one compound represented by Formula 1 below, and the liquid crystal layer does not include a compound represented by Formula A below; and a light-blocking spacer disposed on the display panel and including an area overlapping the switching element, and maintaining the thickness of the liquid crystal layer.

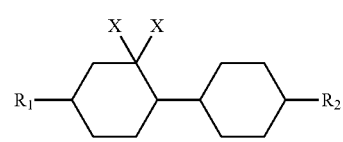

(Formula 1)

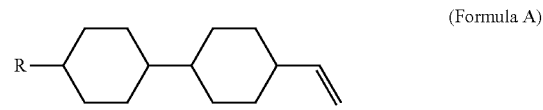

(Formula A)

10 Claims, 4 Drawing Sheets

LIQUID CRYSTAL COMPOSITION AND LIQUID CRYSTAL DISPLAY DEVICE

This application claims priority to Korean Patent Application No. 10-2015-0182894, filed on Dec. 21, 2015, and all the benefits accruing therefrom under 35 U.S.C. 119, the content of which in its entirety is herein incorporated by reference.

BACKGROUND

1. Field

Exemplary embodiment of the invention relate to a liquid crystal composition and a liquid crystal display device including the liquid crystal composition.

2. Description of the Related Art

A display device is a device for visually displaying data. With the advancement of information in society, for the types of display devices developed for displaying images have increased to various forms. Examples of the display devices generally include various display devices, such as a liquid crystal display (LCD), a plasma display panel (PDP), and organic light-emitting diode display (OLED).

The liquid crystal display device, which is a widely used display device, may be configured to include a display panel, a counter display panel, a liquid crystal layer disposed therebetween, and a backlight unit.

SUMMARY

The invention provides a liquid crystal display device having a high voltage holding ratio and excellent high-speed response characteristics.

The invention provides a liquid crystal display composition, which can realize the high voltage holding ratio and high-speed response characteristics of the liquid crystal display device.

A liquid crystal display device according to an exemplary embodiment, includes a display panel a first base substrate, a switching element disposed on the first base substrate, a color filter layer disposed on the switching element, and a pixel electrode disposed on the color filter layer; a counter display panel including a second base substrate and a common electrode disposed on the second base substrate and facing the display panel; a liquid crystal layer disposed between the display panel and the counter display panel and having negative dielectric anisotropy, wherein the liquid crystal layer includes at least one compound represented by Formula 1 below, and the liquid crystal layer does not include a compound represented by Formula A below. The light-blocking spacer disposed on the display panel and including an area overlapping the switching element, and maintains the thickness of the liquid crystal layer.

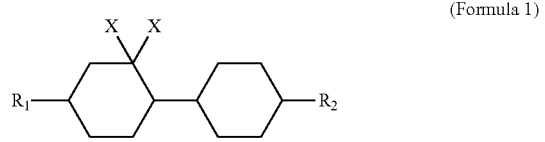

(Formula 1)

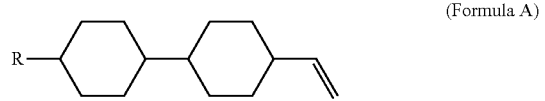

(Formula A)

In the Formula 1, each of $R_1$— and $R_2$— is a $C_{1-10}$ alkyl group, a $C_{1-10}$ alkoxy group, and a $C_{2-10}$ alkenyl group having an internal double bond, $R_1$— and $R_2$— are identical to or different from each other, and X is a hydrogen atom or a halogen atom. In the Formula A, R— is a $C_{1-10}$ alkyl group or a $C_{1-10}$ alkoxy group.

A liquid crystal composition according to another exemplary embodiment, includes at least one compound represented by Formula 1-1 below and a reactive mesogen. The liquid crystal composition does not include a compound represented by Formula A below, and the reactive mesogen is at least one of a compound represented by Formula RM1 below or compound represented by Formula RM2 below.

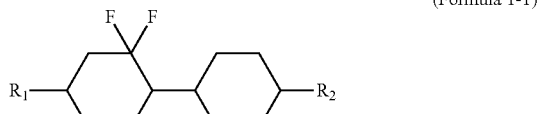

(Formula 1-1)

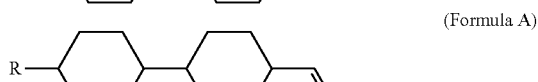

(Formula A)

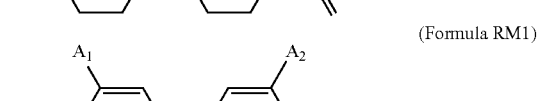

(Formula RM1)

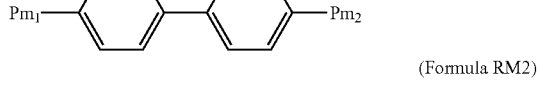

(Formula RM2)

In the Formula 1-1, each of $R_1$— and $R_2$— is a $C_{1-10}$ alkyl group, a $C_{1-10}$ alkoxy group, and a $C_{2-10}$ alkenyl group having an internal double bond; and $R_1$— and $R_2$— are identical to or different from each other.

In the Formula A, R— a $C_{1-10}$ alkyl group or a $C_{1-10}$ alkoxy group.

In the Formula RM1, each of $Pm_1$— and $Pm_2$— is a (meth)acrylate group, a vinyl group, a vinyloxy group, or an epoxy group; $Pm_1$— and $Pm_2$— are identical to or different from each other, and each of $A_1$- and $A_2$- is independently a hydrogen atom or a halogen atom.

In the Formula RM2, each of $Pm_1$— and $Pm_2$— is a (meth)acrylate group, a vinyl group, a vinyloxy group, or an epoxy group, $Pm_1$— and $Pm_2$— are identical to or different from each other, each of $A_1$- and $A_2$- is independently a hydrogen atom or a halogen atom, —$Z_1$— is a $C_{1-10}$ alkyl group or a $C_{1-10}$ alkoxy group; and n is 1 to 2.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1:
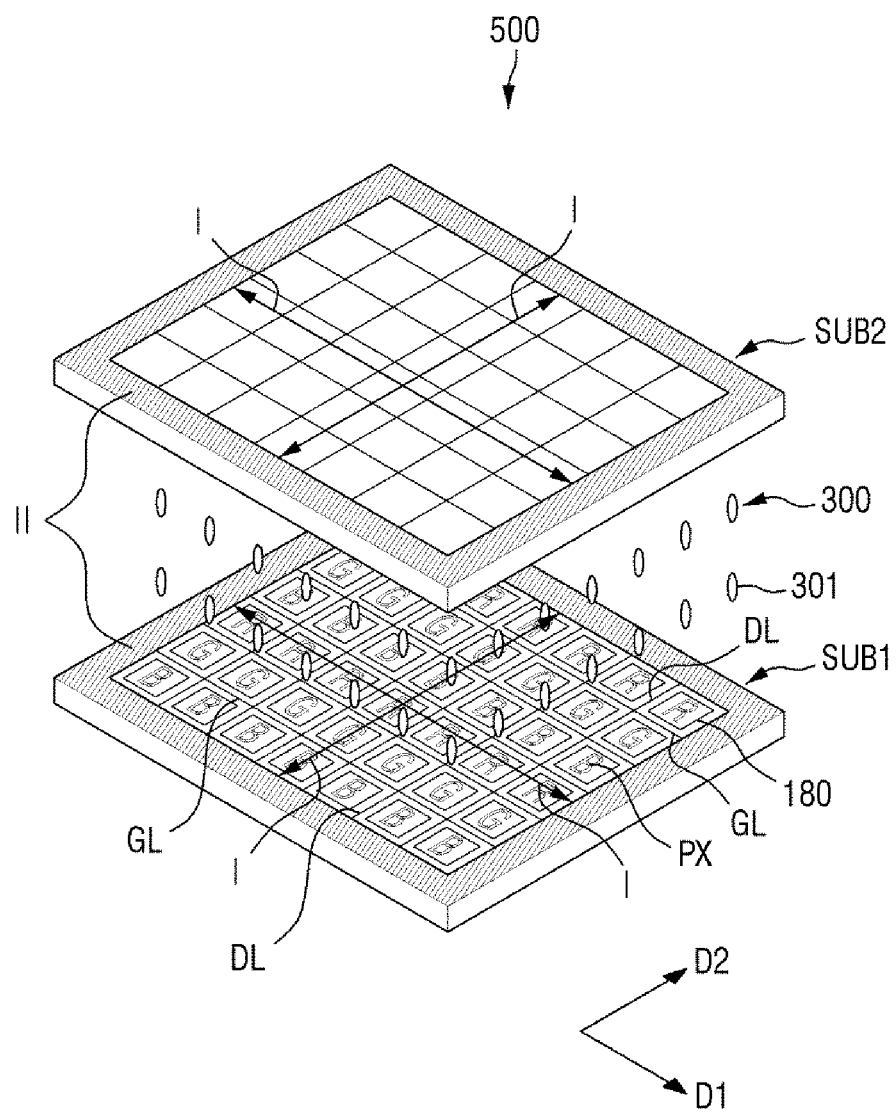
FIG. 1 is a schematic exploded perspective view of a liquid crystal display including a display panel and a counter display panel according to an embodiment.

Features of the invention and methods of accomplishing the same may be understood more readily by referencing the following detailed description of preferred embodiments and the accompanying drawings. The invention may, however, be embodied in many different forms and are not limited to the embodiments set forth herein. Rather, these embodiments are provided to help illustrate the invention to those of ordinary skill in the art.

In the drawings, the thickness of layers and regions are exaggerated for clarity. It will be understood that when an element or layer is referred to as being "on", "connected to" or "coupled to" another element or layer, the element or layer may be directly on, connected or coupled to another element or layer, or intervening elements or layers. In contrast, when an element is referred to as being "directly on", "directly connected to" or "directly coupled to" another element or layer, there are no intervening elements or layers present. As used herein, connected may refer to elements being physically, electrically and/or fluidly connected to each other.

Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections are not limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially related terms, such as "below", "lower", "under", "above", "upper" and the like, may be used herein for ease of description to describe the relationship of one element or feature to another element(s) or feature(s) as illustrated in the figures. It will be understood that the spatially related terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially related descriptors used herein may be interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. "Or" means "and/or." As used herein, the term "and/or" includes any and all combinations of one or more of the associated listed items. It will be further understood that the terms "comprises", "comprising", "includes" and/or "including", when used in this specification, specify the presence of stated features, integers, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Exemplary embodiments of the invention are described hereinafter with reference to the accompanying drawings.

In the present specification, the use of "$C_{A\text{-}B}$" means that the number of carbon atoms is A to B.

Figure 2:
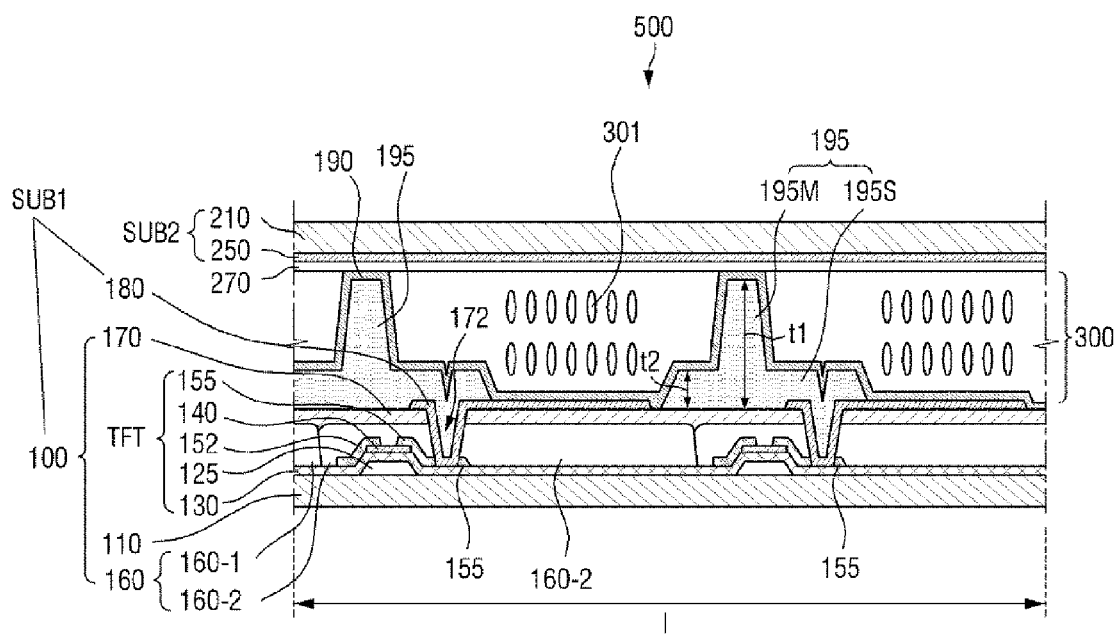
FIG. 2 is a schematic partial cross-sectional view of the display area of the liquid crystal display device of FIG. 1.

FIG. 1 is a schematic exploded perspective view of a liquid crystal display device 500 including a display panel SUB1 and a counter display panel SUB2, and FIG. 2 is a schematic partial cross-sectional view of the display area I of the liquid crystal display device 500 of FIG. 1.

Referring to FIG. 1, the liquid crystal display device 500 may be configured to include: a display panel SUB1; a counter display panel SUB2 disposed to face the display panel SUB1 and be spaced apart from the display panel SUB1 while maintaining a predetermined distance; and a liquid crystal layer 300 disposed between the display panel SUB1 and the counter display panel SUB2. The liquid crystal layer 300 may include liquid crystal compound molecules 301, and the liquid crystal compound molecules 301 may have negative dielectric anisotropy.

The liquid crystal display device 500 includes a display area I and a non-display area II. The display area I is an area in which an image is displayed. The non-display area II is a peripheral area surrounding the display area I, and is an area in which an image is not displayed.

The display panel SUB1 may include a plurality of gate lines GL extending in a first direction and a plurality of data line DL extending in a second direction perpendicular to the first direction. Although not shown in the drawings, the gate lines GL are not disposed only in the display area I, and may also extend to the non-display area II. In this case, the non-display area II may be provided with a gate pad (not shown). That is, in the non-display area II, the display panel SUB1 may include a gate pad (not shown). Further, the data lines DL are not disposed only in the display area I, and may also extend to the non-display area II. In this case, the non-display area II may be provided with a data pad (not shown). That is, in the non-display area II, the display panel SUB1 may include a data pad (not shown).

A plurality of pixels PX defined by the gate lines GL and the data lines DL may be disposed in the display area I. The plurality of pixels PX may be arranged in the form of a matrix, and a pixel electrode 180 may be disposed for each of the pixels PX. In this case, in the display area I, the display panel SUB1 may include the plurality of pixels PX arranged in the form of a matrix and the plurality of pixel electrodes 180 arranged in the form of a matrix.

In the non-display area II, a drive unit (not shown) for providing a gate drive signal and a data drive signal to each of the pixels PX may be disposed. In this case, in the non-display area II, the display panel SUB1 may include a drive unit (not shown). The drive unit (not shown) may generate a gate drive signal and a data drive signal corresponding to a drive frequency of 120 Hertz (Hz) or more.

The display panel SUB1 may include a switching element array substrate (not shown) and a pixel electrode (not shown), and the counter display panel SUB2 may include a second base substrate (not shown) and common electrode (not shown).

Hereinafter, the display panel SUB1, the counter display panel SUB2, and the liquid crystal layer 300 will be described in more detail with reference to FIGS. 1 and 2.

Referring to FIGS. 1 and 2, the display panel SUB1 may be configured to include a switching element array substrate 100 and a pixel electrode 180. The switching element array substrate 100 may be configured to include a first base substrate 110, a switching element TFT disposed on the first base substrate 110, a color filter layer 160 disposed on the switching element TFT, and an organic film 170 disposed on the color filter layer 160.

The counter display panel SUB2, which is a counter panel of the display panel SUB1, may be configured to include a second base substrate 210 and a common electrode 250.

The liquid crystal display device 500 may further include a light-blocking spacer 195, a first liquid crystal alignment layer 190, and a second liquid crystal alignment layer 270. The light-blocking spacer 195 may be disposed between the pixel electrode 180 and the common electrode 250, and may include an area overlapping the switching element TFT. The light-blocking spacer 195 serves as both a spacer for maintaining the thickness of the liquid crystal layer 300 and as a black matrix. The first liquid crystal alignment layer 190 may be disposed on the display panel SUB1, and may include an area disposed between the pixel electrode 180 and the liquid crystal layer 300. The second liquid crystal alignment layer 270 may include an area disposed between the common electrode 250 and the liquid crystal layer 300. Further, the first liquid crystal alignment layer 190 may include an area disposed between the light-blocking spacer 195 and the second liquid crystal alignment layer 270, and the second liquid crystal alignment layer 270 may include an area disposed between the first liquid crystal alignment layer 190 and the common electrode 250.

The liquid crystal display device 500 is realized by a polymer stabilized-vertical alignment mode (PS-VA mode). The PS-VA mode is a technology for stabilizing the pretilt alignment of liquid crystal compound molecules 301 through a polymer network composed of a polymer of a reactive mesogen. The PS-VA mode may be performed by a first method in which the liquid crystal layer 300 is formed using a liquid crystal composition containing the reactive mesogen, and then a polymer network composed of the polymer of the reactive mesogen is formed through an ultraviolet exposure process, or by a second method in which a liquid crystal aligning agent containing the reactive mesogen is applied onto at least one electric field generating electrode of the pixel electrode 180 and the common electrode 250 to form a film, the reactive mesogen is eluted into the liquid crystal layer 300, and then a polymer network composed of a polymer of the reactive mesogen is formed through an ultraviolet exposure process.

The reactive mesogen is a compound having a mesogenic structure for expressing liquid crystallinity and a polymerizable end group for polymerization. For example, the reactive mesogen may be represented by Formula RM below.

$$\text{P1-SP1-MG-SP2-P2} \quad \text{(Formula RM)}$$

In the Formula RM, each of P1 and P2 is a polymerizable end group. Each of P1 and P2 may independently be a (meth)acrylate group, a vinyl group, a vinyloxy group, or an epoxy group; SP1 is a spacer group linking P1 and MG, and may be a $C_{1-12}$ alkylene group, a $C_{1-12}$ polymethylene group, a $C_{1-12}$ alkyleneoxy group, or a $C_{1-12}$ polymethyleneoxy group; SP2 is a spacer group linking P2 and MG, and may be a $C_{1-12}$ alkylene group, a $C_{1-12}$ polymethylene group, a $C_{1-12}$ alkyleneoxy group or a $C_{1-12}$ polymethyleneoxy group; and MG is a compound having a mesogenic structure, and may be cyclohexylene, biphenylene group (which is represented by -Phe-Phe-, in which Phe denotes phenylene), terphenylene group (which is represented by -Phe-Phe-Phe-, in which Phe denotes phenylene), or naphthalene group (which is represented by -naphthalene-.).

The reactive mesogen, for example, may be at least one of a compound represented by Formula RM1 below and a compound represented by Formula RM2 below.

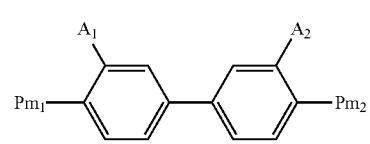

(Formula RM1)

In the Formula RM1, each of $Pm_1$— and $Pm_2$— is a (meth)acrylate group (which is represented by $CH_2=CR-C(=O)-$, where R is hydrogen, a $C_{1-2}$ hydrocarbon radical or a derivative of the $C_{1-2}$ hydrocarbon radical, a vinyl group (which is represented by $CH_2=CH-$), a vinyloxy group (which is represented by $CH_2=CH-O-$), or an epoxy group; $Pm_1$— and $Pm_2$— are identical to or different from each other; and each of $A_1$- and $A_2$- is independently a hydrogen atom or a halogen atom.

(Formula RM2)

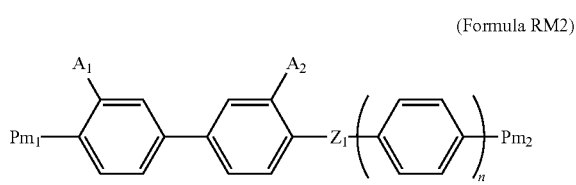

In the Formula RM2, each of $Pm_1$— and $Pm_2$— is a (meth)acrylate group, a vinyl group, a vinyloxy group, or an epoxy group; $Pm_1$— and $Pm_2$— are identical to or different from each other; each of $A_1$- and $A_2$- is independently a hydrogen atom or a halogen atom; —$Z_1$— is $C_{1-10}$ alkyl group or a $C_{1-10}$ alkoxy group; and n is 1 to 2.

Since the compound represented by the Formula RM1 has relatively poor thermal stability compared to the compound represented by the Formula RM2, the compound represented by the Formula RM1 is easily deteriorated during the high-temperature heat treatment process used to form the first and second liquid crystal alignment layers 190 and 270. Therefore, it is preferred that the compound represented by the Formula RM1 is added to the liquid crystal composition during the process of manufacturing the liquid crystal display device 500, and the compound represented by the Formula RM2 is added to the liquid crystal aligning agent during the process of manufacturing the liquid crystal display device 500.

Meanwhile, both the first method and the second method require an ultraviolet exposure process for polymerizing the reactive mesogens. Therefore, it is advantageous if the liquid crystal layer 300 is composed of liquid crystal compound molecules 301 having excellent photostability.

The compound represented by Formula A below is a low-viscosity liquid crystal compound generally used to improve the high-speed response characteristics of the liquid crystal display device 500, but is disadvantageous in that photostability is very poor due to the terminal double bond.

(Formula A)

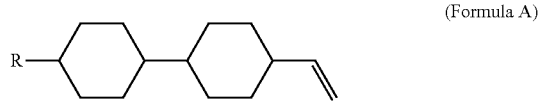

In the Formula A, R is a $C_{1-10}$ alkyl group or a $C_{1-10}$ alkoxy group.

As described above, the counter display panel SUB2 is a counter panel to the display panel SUB1, and includes the second base substrate 210 and the common electrode 250. Specifically, the common electrode 250 is directly disposed on the second base substrate 210.

In the liquid crystal display device 500, the display panel SUB1 includes the color filter layer 160 and the light-blocking spacer 195 (i.e. black matrix), and the counter display panel SUB2 does not include a color filter and a black matrix. Therefore, at the time of the ultraviolet exposure process, the amount of ultraviolet light incident on the liquid crystal layer 300 increases as compared to the case where the counter display panel SUB2 is designed to include a color filter and a black matrix.

Therefore, when the liquid crystal layer 300 contains the compound represented by the Formula A, the compound represented by the Formula A is easily deteriorated, and thus the voltage holding ratio (VHR) of the liquid crystal display device 500 may be lowered. Therefore, it is advantageous that the liquid crystal layer 300 does not contain the compound represented by the Formula A.

The liquid crystal layer 300 contains a compound represented by Formula 1 below instead of the compound represented by the Formula A. Since the compound represented by Formula 1 below is a low-density liquid crystal compound having relatively increased photostability compared to the compound represented by the Formula A and contains a bicyclohexyl group, both the voltage holding ratio and high-speed response characteristics of the liquid crystal display device 500 can be improved.

(Formula 1)

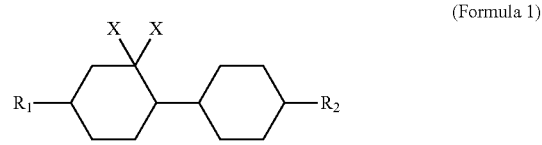

In the Formula 1, each of $R_1$— and $R_2$— is a $C_{1-10}$ alkyl group of $C_{1-10}$, a $C_{1-10}$ alkoxy group, or a $C_{2-10}$ alkenyl group having an internal double bond; $R_1$— and $R_2$— are identical to or different from each other; and X is a hydrogen atom or a halogen atom.

Examples of the compound represented by the Formula 1 may include a compound represented by Formula 1-1 below and a compound represented by Formula 1-2 below.

(Formula 1-1)

(Formula 1-2)

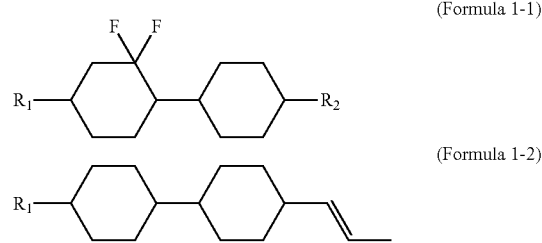

In the Formula 1-1, each of $R_1$— and $R_2$— is a $C_{1-10}$ alkyl group, a $C_{1-10}$ alkoxy group, or a $C_{2-10}$ alkenyl group having an internal double bond; and $R_1$— and $R_2$— are identical to or different from each other. In the Formula 1-2, R— is a $C_{1-10}$ alkyl group, a $C_{1-10}$ alkoxy group, or a $C_{2-10}$ alkenyl group having an internal double bond.

Figure 3:
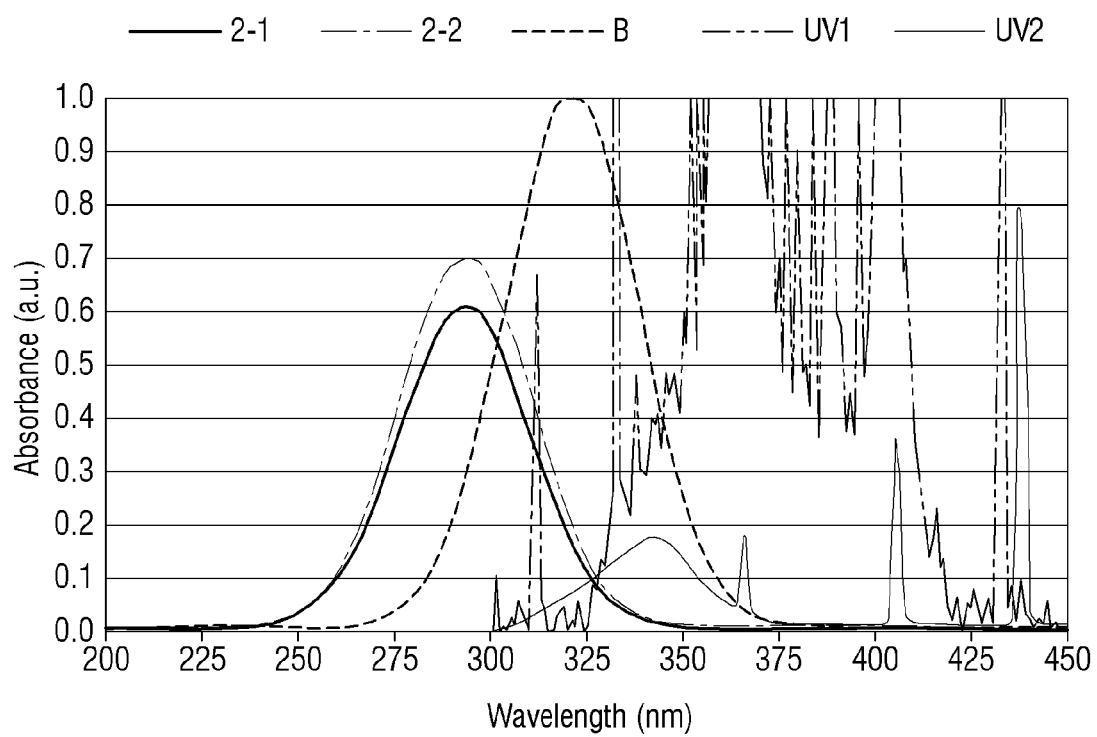
FIG. 3 is a graph illustrating the absorbance (arbitrary units, a.u.) versus the wavelength (nanometers, nm) with respect to the transmission spectra of first and second ultraviolet rays for a compound represented by Formula B and a compound represented by Formula 2.

Meanwhile, FIG. 3 shows a graph comparing the absorption spectra of a compound represented by Formula B below with the absorption spectra of a compound represented by Formula 2 below with respect to the transmission spectra of first and second ultraviolet rays (UV1 and UV2) used in the ultraviolet exposure process. More specifically, in FIG. 3 the absorption spectrum 2-1 was obtained for a compound represented by Formula 2-1 below and the absorption spectrum 2-2 was obtained for a compound represented by Formula 2-2 below, as examples of the absorption spectra of the compound represented by Formula 2 below.

(Formula B)

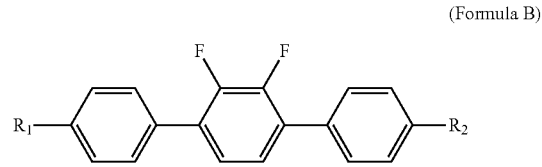

In the Formula B, each of $R_1$— and $R_2$— is a $C_{1-10}$ alkyl group of $C_{1-10}$ or a $C_{1-10}$ alkoxy group; and $R_1$— and $R_2$— are identical to or different from each other.

(Formula 2)

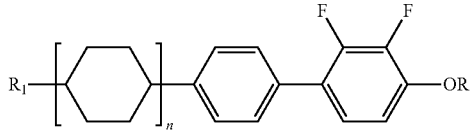

In the Formula 2, R— is a $C_{1-10}$ alkyl group, a $C_{1-10}$ alkoxy group, or a $C_{2-10}$ alkenyl group having an internal double bond; —OR is a $C_{1-10}$ alkoxy group; and n is 0 or 1.

(Formula 2-1)

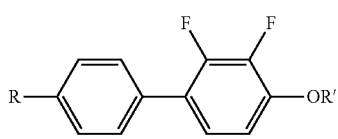

(Formula 2-2)

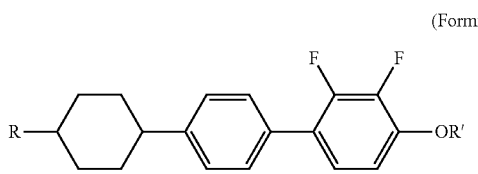

In the Formulae 2-1 and 2-2, R is a $C_{1-10}$ alkyl group, a $C_{1-10}$ alkoxy group, or a $C_{2-10}$ alkenyl group having an inner double bond; and —OR' is a $C_{1-10}$ alkoxy group of $C_{1-10}$.

The compound represented by Formula B is a compound including a terphenyl group, and the compound represented by Formula 2 is a compound including a biphenyl group. Referring to FIG. 3, the compound represented by Formula B absorbs a relatively high amount of ultraviolet rays in the wavelength band of the first and second ultraviolet rays, as compared to the compound represented by Formula 2. Therefore, during the ultraviolet exposure process under the same conditions, the compound represented by Formula B is more easily deteriorated as compared to the compound represented by Formula 2, and thus the voltage holding ratio of the liquid crystal display device 500 may be decreased. Accordingly, the liquid crystal display device 500 is improved when the liquid crystal layer 300 does not contain the compound represented by Formula B.

The liquid crystal layer 300 may include the compound represented by Formula 2 instead of the compound represented by Formula B. Examples of the compound represented by Formula 2 may include the compound represented by Formula 2-1 and the compound represented by Formula 2-2.

Figure 4:
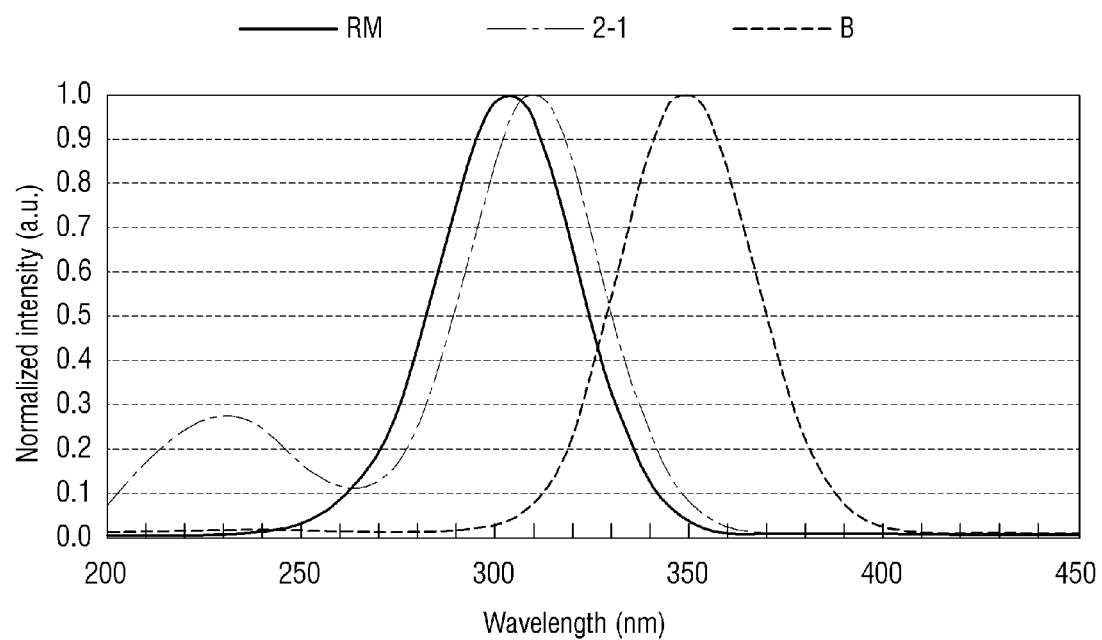
FIG. 4 is a graph illustrating the normalized intensity (a.u.) versus the wavelength (nm) with respect to the absorption spectrum of the reactive mesogen for a compound represented by Formula 2-1 and a compound represented by Formula B.

FIG. 4 shows a graph comparing the emission peak 2-1 of the compound represented by Formula 2-1 with the emission peak B of the compound represented by Formula B with respect to the absorption spectrum RM of reactive mesogen. In FIG. 4, a compound represented by Formula RM1-1 below is used as the reactive mesogen.

(Formula RM1-1)

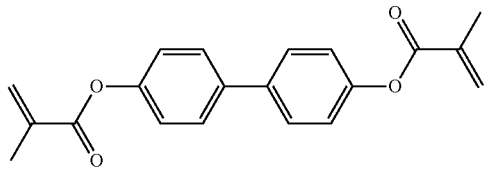

Referring to FIG. 4, the emission peak 2-1 of the compound represented by Formula 2-1 overlaps the absorption spectrum RM of the reactive mesogen to a greater extent than the emission peak B of the compound represented by Formula B. This means that the energy generated from the compound represented by Formula 2-1 can be converted into reaction energy of the reactive mesogen at a high efficiency. Therefore, when the liquid crystal layer 300 contains the compound represented by Formula 2 instead of the compound represented by Formula B, the voltage holding ratio of the liquid crystal display device 500 is improved, thus improving the reactivity of the reactive mesogen as well as improving the reliability of the liquid crystal display device 500.

Meanwhile, when a polymer network composed of polymers of the reactive mesogens is formed according to the first method and the second method, unreacted reactive mesogens may remain in the liquid crystal layer 300. For example, the liquid crystal layer may contain at least one reactive mesogen of at least one of the compounds represented by Formula RM1 and at least one of the compounds represented by Formula RM2. In this case, the reactive mesogen may be present in an amount of less than about 1 wt % with respect to the total weight of the liquid crystal composition.

The liquid crystal layer 300 may include a liquid crystal composition which contains at least one reactive mesogen selected from the compounds represented by Formula RM1 and the compounds represented by Formula RM2, and does not include the compound represented by Formula A and the compound represented by Formula B.

The liquid crystal layer 300 may include a liquid crystal composition which includes: at least one reactive mesogen selected from the compounds represented by Formula RM1 and the compounds represented by Formula RM2, and does not include the compound represented by Formula A and the compounds represented by Formula B; at least one compound represented by Formula 1-1; and at least one compound represented by Formula 2. Here, the at least one compound represented by Formula 2 may be at least one of the compounds represented by Formula 2-1 and the compounds represented by Formula 2-2.

Further, the liquid crystal layer 300 may include a liquid crystal composition which includes: at least one reactive mesogen selected from the compounds represented by Formula RM1 and the compounds represented by Formula RM2, and does not include the compound represented by Formula A and the compound represented by Formula B; at least one of the compounds represented by Formula 1-1; at least one of the compounds represented by Formula 1-1; at least one of the compounds represented by Formula 1-2; and at least one of the compounds represented by Formula 2. Here, the compounds represented by Formula 2 may be at least one of the compounds represented by Formula 2-1 and the compounds represented by Formula 2-2.

Referring to FIGS. 1 and 2 again, the first base substrate 110 is a base substrate of the switching element array substrate 100, and may be made of a transparent insulating material, such as glass or transparent plastic.

The switching element TFT may be a thin film transistor, and the thin film transistor may be configured to include a gate electrode 125, a gate insulating film 130, a semiconductor layer 140, a source electrode 152, and a drain electrode 155. The gate electrode 125, which is a control terminal of the thin film transistor, may be disposed on the first base substrate 110, and may be made of a conductive material. The gate electrode 125 may be branched from the gate line GL. The gate insulating film 130 may be disposed between the gate electrode 125 and the semiconductor layer 140 to insulate them, and may be formed to extend from the display area I to the non-display area II. The semiconductor layer 140, which is a channel layer of the thin film transistor, may be disposed on the gate insulating film 130. The source electrode 152 and the drain electrode 155 may be disposed on the semiconductor layer 140 to be spaced from each other, and may be made of a conductive material. The source electrode 152 is an input terminal of the thin film transistor, and the drain electrode 155 is an output terminal of the thin film transistor. The source electrode 152 and the drain electrode 155 may be branched from the data line DL. Ohmic contact layers (not shown) may be respectively formed between the source electrode 152 and the semiconductor layer 140 and between the drain electrode 155 and the semiconductor layer 140.

The gate line GL may be disposed between the first base substrate 110 and the pixel electrode 180, and the data line DL may be disposed between the gate line GL and the pixel electrode 180.

The color filter layer 160 may be formed on the source electrode 152 and the drain electrode 155. The color filter layer 160 may be disposed on the switching element TFT, and, specifically, may be disposed between the switching element TFT and the pixel electrode 180. The color filter layer 160 may be formed in a region corresponding to each pixel PX in the display area I, and includes a first color filter 160-1 and a second color filter 160-2. For example, the first color filter 160-1 and the second color filter 160-2 may be color filters realizing different colors from each other. Each of the first color filter 160-1 and the second color filter 160-2 may be independently one of a red color filter (R), a green color filter (G), and a blue color filter (B). The first color filter 160-1 and the second color filter 160-2 may be arranged alternately.

The organic film 170 made of an organic material may be formed on the color filter layer 160. The organic film 170 may extend to the non-display area II.

On the organic film 170, the pixel electrode 180 made of a conductive material may be formed for each pixel PX. The pixel electrode 180 may be electrically connected with the drain electrode 155 through a contact hole 172 penetrating the organic film 170 and the color filter layer 160. The switching element TFT is electrically connected to the gate line GL and the pixel electrode 180. The pixel electrode 180 may be made of at least one selected from indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, an alloy thereof, and a laminate thereof. The pixel electrode 180 is disposed between the color filter layer 160 and the liquid crystal layer 300.

The pixel electrode 180 forms an electric field together with the common electrode 250 to control the alignment direction of liquid crystal molecules in the liquid crystal layer 300. The pixel electrode 180 may be a pattern electrode having at least one of a protrusion pattern and a slit pattern, or may be a patternless electrode.

The light-blocking spacer 195 may be disposed on the display panel SUB1. Specifically, the light-blocking spacer 195 may include an area disposed between the pixel electrode 180 and the common electrode 250, and an area disposed to overlap the switching element TFT. The light-blocking spacer 195 serves as both a spacer for maintaining the thickness of the liquid crystal layer 300 and as a black matrix. The light-blocking spacer 195 may be made of a light-blocking material, such as an organic material containing carbon black. The light-blocking material may also be made of a material having predetermined elasticity. The light-blocking spacer 195 serves as both a black matrix and a spacer for maintaining the thickness of the liquid crystal layer 300. The light-blocking spacer 195, for example, may include a main spacer 195M and a sub-spacer 195S. The main spacer 195M is formed to have a height greater than that of the sub-spacer 195S, and can serve to maintain the thickness of the liquid crystal layer 300 even when an external force is applied to the liquid crystal display device 500. The sub-spacer 195S can serve to prevent the elasticity of the main spacer 195M from being destroyed by buffering the external force applied to the main spacer 195M when the external force is stronger than the elasticity of the main spacer 195M. The thickness t1 of the main spacer 195M differs from the thickness t2 of the sub-spacer 195S. The thickness difference t1−t2 between the main spacer 195M and the sub spacer 195S may be about 0.25 micrometers (μm) to about 0.8 μm. For example, when the main spacer 195M has a thickness t1 of about 3 μm, the sub spacer 195S may have a thickness t2 of about 2.5 μm.

The first liquid crystal alignment layer 190 may include an area disposed between the pixel electrode 180 and the liquid crystal layer 300 and an area disposed between the light-blocking spacer 195 and the second liquid crystal alignment layer 270. The first liquid crystal alignment layer 190 may extend to the non-display area II as well as the display area I. The first liquid crystal alignment layer 190 may include a polymer network composed of a polymers of the reactive mesogen, and, for example, may include a polymer network composed of a polymer of at least one mesogen selected from the compound represented by Formula RM1 and the compound represented by Formula RM2.

The polymer network composed of the polymers of the reactive mesogen serves to align the liquid crystal compound molecules 301 at a predetermined pretilt angle with respect to the display panel SUB1 and the counter display panel SUB2 even in a state where an electric field is not applied to the liquid crystal display device 500. The pretilt angle means an angle formed between the display panel SUB1 and the direction of the liquid crystal compound molecules 301 and an angle between the counter display panel SUB2 and the direction of the liquid crystal compound molecules 301.

Although not shown in the drawings, the first liquid crystal alignment layer 190 includes a polyimide-based alignment base layer and the polymer network composed of the polymer of the reactive mesogen, and may further include an alignment stabilizing layer formed on the polyimide-based alignment base layer. However, since the polyimide-based alignment base layer is optional and may be omitted, the first liquid crystal alignment layer 190 may not include both the polyimide-based alignment base layer and the alignment stabilizing layer.

The second base substrate 210 is a base substrate of the counter display panel SUB2, and may be made of a transparent insulating material, such as glass or transparent plastic.

The common electrode 250 may be directly disposed on the second base substrate 210. The common electrode 250 may be a pattern electrode having at least one of a protrusion pattern and a slit pattern, or may be a patternless electrode. The common electrode 250 may be made of at least one selected from indium tin oxide, indium zinc oxide, indium oxide, zinc oxide, tin oxide, gallium oxide, titanium oxide, aluminum, silver, platinum, chromium, molybdenum, tantalum, niobium, zinc, magnesium, an alloy thereof, or a laminate thereof.

The second liquid crystal alignment layer 270 may be directly disposed on the common electrode 250. The second liquid crystal alignment layer 250 may include an area disposed between the common electrode 250 and the liquid crystal layer 300 and an area disposed between the common electrode 250 and the first liquid crystal alignment layer 190. The second liquid crystal alignment layer 270 may extend to the non-display area II as well as the display area I. The second liquid crystal alignment layer 270 may include a polymer network composed of the polymer of the reactive mesogen, and, for example, may include a polymer network composed of a polymer of at least one mesogen selected from the compound represented by Formula RM1 and the compound represented by Formula RM2. The polymer network composed of the polymer of reactive mesogen serves to align the liquid crystal compound molecules 301 at a predetermined pretilt angle with respect to the display panel SUB1 and the counter display panel SUB2 even in a state where an electric field is not applied to the liquid crystal display device 500. The pretilt angel means an angle between the display panel SUB1 and the direction of the liquid crystal compound molecules 301 and an angle between the counter display panel SUB2 and the direction of the liquid crystal compound molecules 301.

Although not shown in the drawings, the second liquid crystal alignment layer 270 includes a polyimide-based alignment base layer and the polymer network composed of the polymer of the reactive mesogen, and may further include an alignment stabilizing layer formed on the polyimide-based alignment base layer. However, since the polyimide-based alignment base layer may be emitted, the second liquid crystal alignment layer 270 may not include both the polyimide-based alignment base layer and the alignment stabilizing layer.

Although not shown in the drawing, the liquid crystal display device 500 may further include a backlight assembly (not shown) disposed on the rear surface of the display panel SUB1 to provide light to the liquid crystal layer 300.

The backlight assembly, for example, may include a light guide plate (LGP), a light source, a reflection member, and an optical sheet.

The light guide plate serves to change the path of light emitted from the light source toward the liquid crystal layer 300, and may include a light incidence surface provided to allow the light emitted from the light source to be applied thereto, and a light emission surface capable of emitting the incident light toward the liquid crystal layer 300. The light guide plate may be made of a light transmissive material having a predetermined refractive index, such as poly(methyl methacrylate) (PMMA) or polycarbonate (PC), but is not limited thereto.

When the incoming light is incident upon one side or both sides of the light guide plate made of such a material, the light has an angle within the critical angle, and the light is transmitted to the inside of the light guide plate. Further, when the incoming light is incident on the upper surface or lower surface of the light guide plate, the angle of the light exceeds the critical angle, so that the light is not emitted to the outside of the light guide plate, and is instead uniformly transmitted in the light guide plate.

A scattering pattern may be formed on any one of the upper and lower surfaces of the light guide plate. For example, a scattering pattern may be formed on the upper surface facing the light emission surface, such that the guided light is emitted to the upper surface of the light guide plate. That is, the scattering pattern may be printed with ink on one side of the light guide plate such that the light transmitted by the light guide plate is emitted to the upper surface of the light guide plate. Such a scattering pattern may be formed by printing with ink, but is not limited thereto. Further, the light guide plate may be provided with fine grooves or protrusions, and may be variously modified.

The reflection member may be provided between the light guide plate and the bottom of the storage member. The reflection member serves to reflect the light emitted to the lower surface of the light guide plate, that is, the opposite surface facing the light emission surface, and to supply the reflected light to the light guide plate. The reflection member may be fabricated in the form of a film, but is not limited thereto.

The light source may be disposed to face the light incidence surface of the light guide plate. The number of light sources can be appropriately changed as needed. For example, only one side of the light guide plate can be provided with one light source, and three or more light sources can also be provided corresponding to three or more sides of four sides of the light guide plate. Further, a plurality of light sources can be provided corresponding to any one of sides of the light guide plate. As described above, the side light type light source has been described as an example, but other examples thereof include a direct type light source and a surface shape type light source.

The light source may be a white LED emitting white light, and may also be a plurality of LEDs each independently emitting red light (R), green light (G), or blue light (B). In the case where the plurality of light sources are the plurality of LEDs each independently emitting red light (R), green light (G), or blue light (B), when these light sources turn on at once, white light can be realized by color mixing.

As described above, according to embodiments described herein, the following effects may be achieved.

The liquid crystal display device according to an embodiment can exhibit a high voltage holding ratio and high-speed response characteristics.

The liquid crystal composition according to another embodiment can be used to manufacture the liquid crystal display device having a high voltage holding ratio and high-speed response characteristics.

The effects of the various embodiments are not limited by the foregoing, and other various effects are also anticipated herein.

While the invention has been particularly shown and described with reference to exemplary embodiments thereof, it will be understood by those of ordinary skill in the art that various changes in implementation and detail may be made therein without departing from the spirit and scope of the following claims. The exemplary embodiments should be considered in a descriptive sense only and not for purposes of limitation.

What is claimed is:

1. A liquid crystal display device, comprising:
a display panel comprising a first base substrate, a switching element disposed on the first base substrate, a color filter layer disposed on the switching element, and a pixel electrode disposed on the color filter layer;
a counter display panel comprising a second base substrate and a common electrode disposed on the second base substrate and facing the display panel;
a liquid crystal layer disposed between the display panel and the counter display panel and having negative dielectric anisotropy, wherein the liquid crystal layer comprises at least one compound represented by Formula 1 below, and the liquid crystal layer does not comprise a compound represented by Formula A below; and
a light-blocking spacer disposed on the display panel, and comprising an area overlapping the switching element, wherein the light-blocking spacer serves as a spacer for maintaining a thickness of the liquid crystal layer:

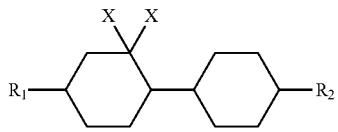
(Formula 1)

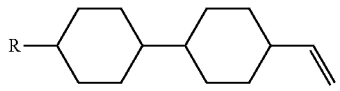
(Formula A)

where in the Formula 1, each of $R_1$— and $R_2$— is a $C_{1-10}$ alkyl group, a $C_{1-10}$ alkoxy group, or a $C_{2-10}$ alkenyl group having an internal double bond; $R_1$— and $R_2$— are identical to or different from each other; and X is a hydrogen atom or a halogen atom, and in the Formula A, R— is a $C_{1-10}$ alkyl group or a $C_{1-10}$ alkoxy group.

2. The liquid crystal display device of claim 1,
wherein at least one of the compounds represented by Formula 1 is a compound represented by Formula 1-1 or a compound represented by Formula 1-2:

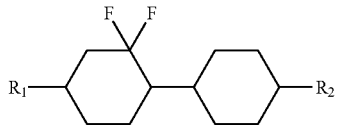
(Formula 1-1)

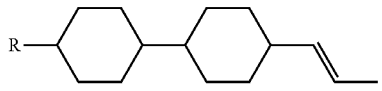
(Formula 1-2)

where in the Formula 1-1, each of $R_1$— and $R_2$— is a $C_{1-10}$ alkyl group, a $C_{1-10}$ alkoxy group, or a $C_{2-10}$ alkenyl group having an internal double bond; and $R_1$— and $R_2$— are identical to or different from each other, and in the Formula 1-2, R— is a $C_{1-10}$ alkyl group, a $C_{1-10}$ alkoxy group, or a $C_{2-10}$ alkenyl group having an internal double bond.

3. The liquid crystal display device of claim 1,
wherein the liquid crystal layer further comprises at least one compound represented by Formula 2 below, and the liquid crystal layer does not comprise a compound represented by Formula B:

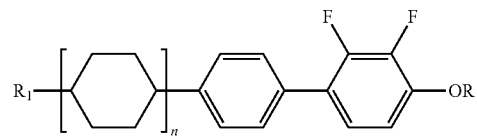
(Formula 2)

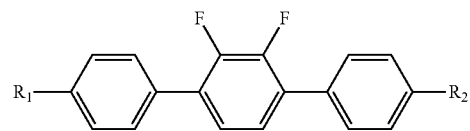
(Formula B)

where in the Formula 2, each R— is independently a $C_{1-10}$ alkyl group, a $C_{1-10}$ alkoxy group, or a $C_{2-10}$ alkenyl group of $C_{2-10}$ having an internal double bond; —OR is a $C_{1-10}$ alkoxy group; and n is 0 or 1, and in the Formula B, each of $R_1$— and $R_2$— is a $C_{1-10}$ alkyl group or a $C_{1-10}$ alkoxy group; and $R_1$— and $R_2$— are identical to or different from each other.

4. The liquid crystal display device of claim 1,
wherein the liquid crystal layer further comprises at least one compound represented by Formula RM1 below:

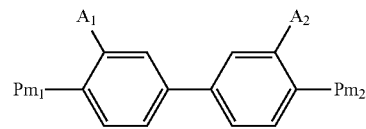
(Formula RM1)

where in the Formula RM1, each of $Pm_1$— and $Pm_2$— is a (meth)acrylate group, a vinyl group, a vinyloxy group, or an epoxy group; $Pm_1$— and $Pm_2$— are identical to or different from each other; and each of $A_1$- and $A_2$- are independently a hydrogen atom or a halogen atom.

5. The liquid crystal display device of claim 4, further comprising:
a first liquid crystal alignment layer disposed between the pixel electrode and the liquid crystal layer; and
a second liquid crystal alignment layer disposed between the counter display panel and the liquid crystal layer,
wherein at least one of the first liquid crystal alignment layer and the second liquid crystal alignment layer comprises a polymer of the compound represented by Formula RM1.

6. The liquid crystal display device of claim 1,
wherein the liquid crystal layer further comprises at least one of a compound represented by Formula RM2 or a polymer thereof:

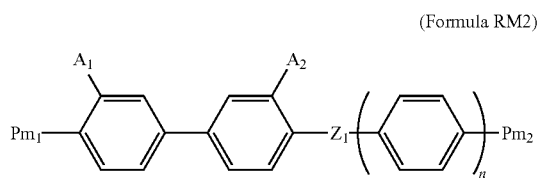

where in the Formula RM2, each of $Pm_1$— and $Pm_2$— is a (meth)acrylate group, a vinyl group, a vinyloxy group, or an epoxy group; $Pm_1$— and $Pm_2$— are identical to or different from each other; each of $A_1$- and $A_2$- is independently a hydrogen atom or a halogen atom; —$Z_1$— is a $C_{1-10}$ alkyl group of or a $C_{1-10}$ alkoxy group; and n is 1 to 2.

7. The liquid crystal display device of claim 6, further comprising:
a first liquid crystal alignment layer disposed between the pixel electrode and the liquid crystal layer; and
a second liquid crystal alignment layer disposed between the common electrode and the liquid crystal layer,
wherein at least one of the first liquid crystal alignment layer and the second liquid crystal alignment layer comprises a polymer of the compound represented by Formula RM2.

8. A liquid crystal composition, comprising:
at least one compound represented by Formula 1-1 below; and
a reactive mesogen,
wherein the liquid crystal composition does not comprise a compound represented by Formula A below, and the reactive mesogen is at least one of a compound represented by Formula RM1 below or a compound represented by Formula RM2 below:

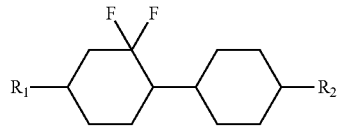
(Formula 1-1)

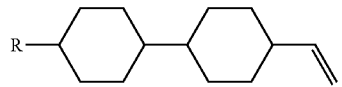
(Formula A)

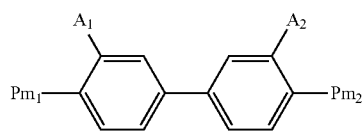
(Formula RM1)

(Formula RM2)

where in the Formula 1-1, each of $R_1$— and $R_2$— is a $C_{1-10}$ alkyl group, a $C_{1-10}$ alkoxy group, or a $C_{2-10}$ alkenyl group having an internal double bond; and $R_1$— and $R_2$— are identical to or different from each other, in the Formula A, R— is a $C_{1-10}$ alkyl group or a $C_{1-10}$ alkoxy group, in the Formula RM1, each of $Pm_1$— and $Pm_2$— is a (meth)acrylate group, a vinyl group, a vinyloxy group, or an epoxy group; $Pm_1$— and $Pm_2$— are identical to or different from each other; and each of $A_1$- and $A_2$- is independently a hydrogen atom or a halogen atom, and in the Formula RM2, each of $Pm_1$— and $Pm_2$— is a (meth)acrylate group, a vinyl group, a vinyloxy group, or an epoxy group; $Pm_1$— and $Pm_2$— are identical to or different from each other; each of $A_1$- and $A_2$- is independently a hydrogen atom or a halogen atom; —$Z_1$— is a $C_{1-10}$ alkyl group of $C_{1-10}$ or a $C_{1-10}$ alkoxy group; and n is 1 to 2.

9. The liquid crystal composition of claim 8,
wherein the liquid crystal composition further comprises at least one compound represented by Formula 2 below, and does not comprise a compound represented by Formula B:

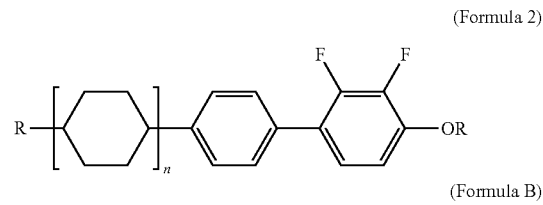
(Formula 2)

(Formula B)

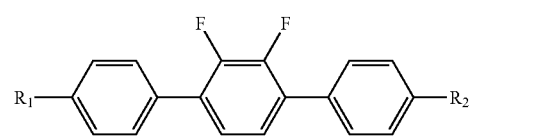

where in the Formula 2, each R— is independently a $C_{1-10}$ alkyl group, a $C_{1-10}$ alkoxy group, or a $C_{2-10}$ alkenyl group having an internal double bond; —OR is a $C_{1-10}$ alkoxy group; and n is 0 or 1, and in the Formula B, each of $R_1$— and $R_2$— is a $C_{1-10}$ alkyl group or a $C_{1-10}$ alkoxy group; and $R_1$— and $R_2$— are identical to or different from each other.

10. The liquid crystal composition of claim 8,
wherein the liquid crystal composition further comprises at least one compound represented by Formula 1-2 below:

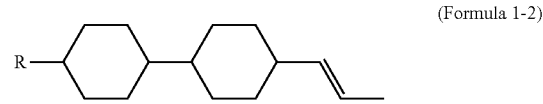
(Formula 1-2)

where in the Formula 1-2, R— is a $C_{1-10}$ alkyl group, a $C_{1-10}$ alkoxy group, or a $C_{2-10}$ alkenyl group having an internal double bond.

* * * * *